US011731775B2

(12) United States Patent
Cousin et al.

(10) Patent No.: US 11,731,775 B2
(45) Date of Patent: Aug. 22, 2023

(54) AIRCRAFT NACELLE COMPRISING A COWL AND AN AUTOMATICALLY-OPERATED LOCKING DEVICE THAT LIMITS THE DEFORMATION OF THE COWL

(71) Applicant: Airbus Operations SAS, Toulouse (FR)

(72) Inventors: Antoine Cousin, Toulouse (FR); Laurent Caliman, Toulouse (FR); Jérôme Gaillardo, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 106 days.

(21) Appl. No.: 17/210,621

(22) Filed: Mar. 24, 2021

(65) Prior Publication Data

US 2021/0300578 A1    Sep. 30, 2021

(30) Foreign Application Priority Data

Mar. 26, 2020  (FR) ...................... 2002969

(51) Int. Cl.
*B64D 29/06*    (2006.01)
*B64D 29/08*    (2006.01)
*F02K 1/80*     (2006.01)

(52) U.S. Cl.
CPC ............. *B64D 29/06* (2013.01); *B64D 29/08* (2013.01); *F02K 1/80* (2013.01); *F05D 2260/30* (2013.01)

(58) Field of Classification Search
CPC ........... F02K 1/80; B64D 29/06; B64D 29/08; F05D 2260/30
See application file for complete search history.

(56) References Cited

U.S. PATENT DOCUMENTS 4,549,708 A  *  10/1985  Norris .................... B64D 29/06
                                                        292/28
2010/0284806 A1    11/2010  Vauchel et al.
(Continued)

FOREIGN PATENT DOCUMENTS

EP    3016861 B1      5/2017
FR    3081444 A1     11/2019
WO    2008053087 A1   5/2008

OTHER PUBLICATIONS

French Search Report; priority document.

*Primary Examiner* — Andrew H Nguyen
(74) *Attorney, Agent, or Firm* — Greer, Burns & Crain, Ltd.

(57) ABSTRACT

An aircraft nacelle including an automatically-operated locking device for limiting deformations of the cowl. This automatically-operated locking device includes at least one locking post connected to the cowl, at least one latch able to move between a first position corresponding to a locked state in which the latch prevents the locking post from becoming distanced from a fixed structure and a second position corresponding to an unlocked state in which the latch allows the locking post to become distanced from the fixed structure, at least one return system configured to hold the latch in its second position corresponding to the unlocked state, the cowl holding the latch in its first position when the cowl is in the closed position and allowing the latch to pivot toward its second position when the cowl is in the open position.

9 Claims, 5 Drawing Sheets

(56) References Cited

U.S. PATENT DOCUMENTS

2016/0101871 A1   4/2016  Boileau et al.
2016/0245226 A1*  8/2016  Brown ...................... F02K 1/54
2017/0275010 A1*  9/2017  Pretty ...................... B64C 7/02
2019/0055902 A1*  2/2019  Stone ..................... B64D 29/08

* cited by examiner

AIRCRAFT NACELLE COMPRISING A COWL AND AN AUTOMATICALLY-OPERATED LOCKING DEVICE THAT LIMITS THE DEFORMATION OF THE COWL

CROSS-REFERENCES TO RELATED APPLICATIONS

This application claims the benefit of the French patent application No. 2002969 filed on Mar. 26, 2020, the entire disclosures of which are incorporated herein by way of reference.

FIELD OF THE INVENTION

The present application relates to an aircraft nacelle comprising a cowl as well as an automatically-operated locking device that limits the deformation of the cowl.

BACKGROUND OF THE INVENTION

According to one embodiment, an aircraft nacelle comprises a fixed structure and right and left cowls, arranged on either side of a vertical longitudinal plane, and which are connected to the fixed structure by articulations positioned at the upper edge of each cowl. Thus, each of the right and left cowls pivots about a pivot axis approximately parallel to a longitudinal direction so as to pass from a closed position to an open position. In order to hold them in the closed position, the cowls comprise manually-operated locking devices connecting their lower edges, and distributed along the length of the cowls. These manually-operated locking devices, which are positioned in the lower part of the nacelle, can be actuated manually from the ground.

In order to limit in-flight deformations of the cowls, the articulation of each cowl comprises an articulation point for each manually-operated locking device, which point is positioned substantially in the same transverse plane as the manually-operated locking device.

When the cowls are positioned in a portion of the nacelle that has a substantially constant cross section, the articulation points are simple in design and take the form of a pivot connection.

When the cowls are positioned in a portion of the nacelle that has a cross section that decreases, such as the rear section of the nacelle, the distance between the upper edge of each cowl and the fixed structure is not constant along the entire length of the cowl. In the case of the rear section of the nacelle, the rear part of the upper edge of each cowl is spaced away from the fixed structure when the cowl is in the open position, which means that it is difficult to provide an articulation point on the rear part of the upper edge of the cowl.

In the absence of an articulation point on the rear part of the upper edge of each cowl, it is necessary for this part to be connected to the fixed structure so as to prevent the rear part of the cowl from deforming as a result of aerodynamic loadings, particularly in flight.

In one solution, a manually-operated locking device could be positioned at the rear part of the upper edge of the cowl to connect it to the fixed structure. In that case, a manual control for effecting the locking and unlocking of the locking device needs to be positioned in the lower part of the cowl so as to be accessible from the ground. Dissociating the locking device from the control used to operate it tends to make the assembly more complex.

The present invention seeks to overcome all or some of the disadvantages of the prior art.

SUMMARY OF THE INVENTION

To this end, a subject of the invention is an aircraft nacelle comprising a fixed structure, at least one cowl having upper and lower edges and at least one articulation connecting the upper edge of the cowl and the fixed structure so as to allow the cowl to pivot about an articulation axis parallel to a longitudinal direction between a closed position and an open position, as well as at least one manually-operated locking device for holding the cowl in the closed position.

According to the invention, the nacelle comprises an automatically-operated locking device comprising:

at least one locking post connected to the cowl, at least one latch able to move between a first position corresponding to a locked state in which the latch retains the locking post and prevents it from becoming distanced from the fixed structure and a second position corresponding to an unlocked state in which the latch allows the locking post to become distanced from the fixed structure, at least one return system configured to hold the latch in its second position corresponding to the unlocked state, the cowl holding the latch in its first position when the cowl is in the closed position and allowing the latch to pivot toward its second position when the cowl is in the open position.

According to the invention, the automatically-operated locking device switches from the locked state to the unlocked state or vice versa automatically, on opening or on closing the cowl. In addition, all the elements of the automatically-operated locking device are grouped together and not positioned at each of the ends of the cowl, and this contributes to simplifying the design.

According to other features considered separately or in combination:

the automatically-operated locking device comprises a fixed stop, connected to the fixed structure, the latch holding the locking post against the fixed stop when the latch is in the first position corresponding to the locked state;

the automatically-operated locking device comprises a pivot axis, approximately perpendicular to the longitudinal direction, connecting the latch to a support solid with the fixed structure;

the automatically-operated locking device comprises a lever, a first articulation connecting the lever and the latch, a connecting rod, a second articulation connecting the connecting rod and the support, as well as a third articulation connecting the lever and the connecting rod, the first, second and third articulations each comprising at least one pivot axis parallel to the pivot axis of the latch;

the return system comprises two traction springs which are positioned one on either side of the lever, each having a first end connected to the lever as well as a second end connected to a right-angle bracket solid with the support, the latch, the support, the lever, the connecting rod and the right-angle brackets being configured so that the traction springs exert a force that causes the latch to pivot about the pivot axis from the first position toward the second position;

the automatically-operated locking device comprises a cam, solid with the cowl, having a first contact face configured to collaborate with the lever, the lever comprising, at one of its ends distant from the latch, a second contact face configured to collaborate with the first contact face belonging to the cam;

the second contact face is convex and has an approximately semicylindrical shape with an axis substantially parallel to the longitudinal direction;

the first contact face comprises a first longitudinal groove configured to house the lever when the automatically-operated locking device is in the locked state, as well as a second longitudinal groove to allow a progressive pivoting of the latch from the second position toward the first position;

the first and second longitudinal grooves are separated by a ridge that holds the lever in the first longitudinal groove as long as a force exerted for causing the cowl to pivot and open does not exceed a given threshold;

the automatically-operated locking device is positioned in the vicinity of the upper edge of the cowl, in the same transverse plane as a manually-operating locking device positioned in the vicinity of the lower edge of the cowl.

BRIEF DESCRIPTION OF THE DRAWINGS

Further features and advantages will become apparent from the following description of the invention, which description is given purely by way of example with reference to the attached drawings among which.

DETAILED DESCRIPTION OF THE PREFERRED EMBODIMENTS

Figure 1:
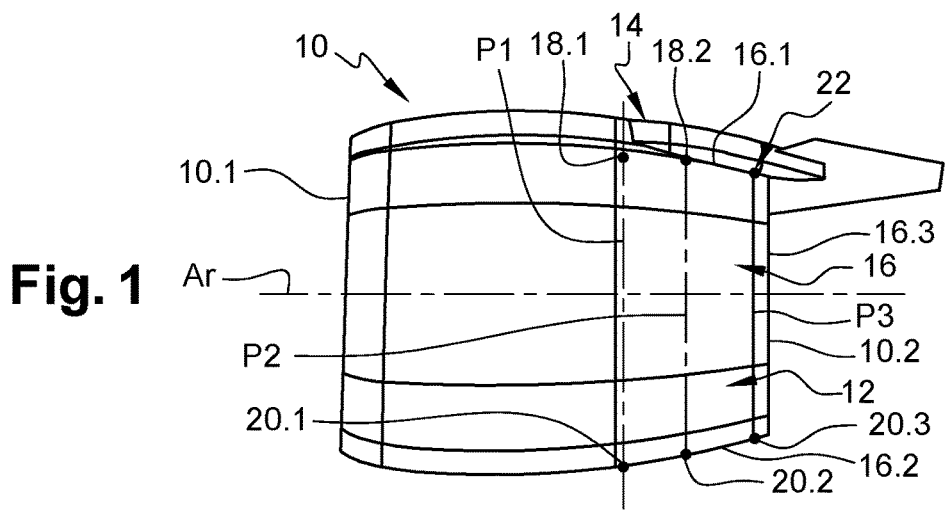
FIG. 1 is a side view of an aircraft nacelle, illustrating one embodiment of the invention.
Figure 2:
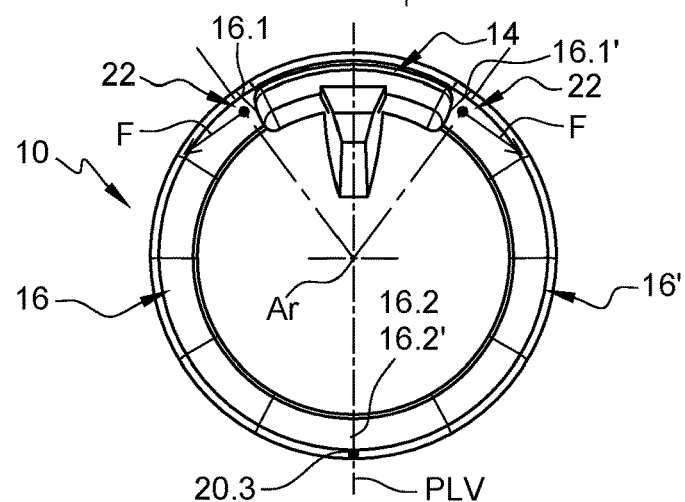
FIG. 2 is a rear view of a part of the nacelle visible in FIG. 1.
Figure 3:
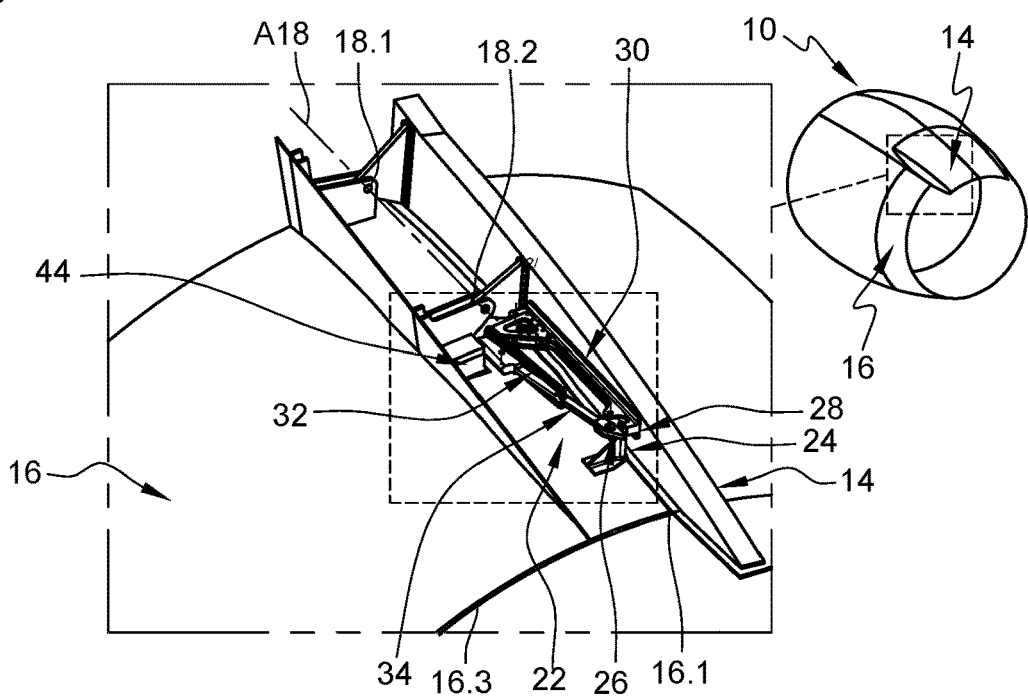
FIG. 3 is a perspective view of part of a nacelle incorporating an automatically-operated locking device in the locked state illustrating one embodiment of the invention.

According to one embodiment visible in FIGS. 1 to 3, an aircraft nacelle 10 extends between a leading edge 10.1 and a trailing edge 10.2. In operation, the nacelle 10 is positioned around a turbine engine having an axis of rotation Ar.

For the remainder of the description, a longitudinal direction is parallel to the axis of rotation Ar. A radial direction is perpendicular to the axis of rotation Ar. A transverse plane is a plane perpendicular to the axis of rotation Ar. A vertical longitudinal plane PLV is a vertical plane passing through the axis of rotation Ar. The terms front and rear refer to the direction in which a stream of air flows, the leading edge 10.1 corresponding to the front and the trailing edge 10.2 to the rear.

In one configuration, the nacelle 10 has an approximately barrel shape. It has a rear section 12, adjoining the trailing edge 10.2, the cross section of which decreases from the front toward the rear.

The nacelle 10 comprises a fixed structure 14 positioned in the upper part of the nacelle 10 and at least one cowl 16, positioned in the rear section 12, having an upper edge 16.1 connected to the fixed structure 14 and configured to pivot about an articulation axis A18 between a closed position and an open position passing via a partially open position. The pivot axis A18 is substantially parallel to the longitudinal direction. The nacelle 10 comprises at least one manually-operated locking device 20.1, 20.2, 20.3 configured to hold the cowl 16 in the closed position.

In one configuration, the nacelle 10 comprises first and second cowls 16, 16' positioned one on each side of the vertical longitudinal plane PLV, approximately symmetrically about the plane. Each of the first and second cowls 16, 16' is connected to the fixed structure 14 by first and second articulation points 18.1, 18.2 positioned at the upper edge 16.1, 16.1' of the cowl 16, 16'. The first and second cowls 16, 16' comprise lower edges 16.2, 16.2' which are connected to one another by first, second and third manually-operated locking devices 20.1, 20.2, 20.3 to hold them in the closed position, these being situated in first, second and third transverse planes P1, P2, P3; the first transverse plane P1 being situated at the front of the rear section 12, the third transverse plane P3 being situated at the rear of the rear section 12, the second transverse plane P2 being interposed approximately equal distances from the first and third transverse planes P1, P3.

The first articulation point 18.1 and the first manually-operated locking device 20.1 are positioned in the first transverse plane P1. The second articulation point 18.2 and the second manually-operated locking device 20.2 are positioned in the second transverse plane P2.

The nacelle 10, the first and second cowls 16, 16', the articulation points 18.1, 18.2 and the manually-operated articulation devices 20.1, 20.2, 20.3 are not described further because these can be identical to those of the prior art.

Whatever the embodiment, the nacelle 10 comprises a fixed structure 14, at least one cowl 16 having upper and lower edges 16.1, 16.2, at least one articulation 18.1, 18.2 connecting the upper edge 16.1 of the cowl 16 and the fixed structure 14 so as to allow it to pivot about an articulation axis A18 between a closed position and an open position, as well as at least one manually-operated locking device 20.1, 20.2, 20.3 for holding the cowl 16 in the closed position.

The first and second articulation points 18.1, 18.2 are distant from the rear edge 16.3 of the cowl 16, 16'.

In order to prevent the upper edge 16.1, 16.1' of each cowl 16, 16' from becoming deformed and becoming distanced from the fixed structure 14 as a result of the aerodynamic loading particularly in flight, the nacelle 10 comprises, for at least one of the first and second cowls 16, 16' and preferably for each cowl 16, 16', at least one automatically-operated locking device 22 which absorbs the distancing forces F and is positioned in the vicinity of the upper edge 16.1, 16.1' of the cowl 16, 16'. According to one embodiment, the distancing forces are oriented in a direction of distancing perpendicular to a radial direction passing approximately through the upper edge 16.1, 16.1' of the cowl 16, 16'. In one configuration, the automatically-operated locking device 22 is positioned in the one same transverse plane close to the trailing edge 10.2 of the nacelle 10 as the third manually-operated locking device 20.3.

Each automatically-operated locking device 22 comprises at least one locking post 24, connected to the cowl 16, 16', and positioned close to the upper edge 16.1, 16.1' of the cowl 16, 16' and oriented in a direction approximately perpendicular to the distancing forces F, namely approximately perpendicular to the longitudinal direction.

According to one embodiment, the locking post 24 comprises a shank 24.1 and a mounting plate 24.2 substantially perpendicular to the shank 24.1, fixed to the cowl 16, 16' by fasteners (bolts, rivets or the like), the shank 24.1 and the mounting plate 24.2 forming just one single component.

To complement the locking post 24, the automatically-operated locking device 22 comprises at least one latch 26 able to move between a first position in which it holds the locking post 24 and prevents it from becoming distanced from the fixed structure 14 and a second position in which it allows the locking post 24 to become distanced from the fixed structure 14. In the first position corresponding to the locked state of the automatically-operated locking device 22, the upper edge 16.1, 16.1' of the cowl 16, 16' is unable to become distanced from the fixed structure 14. In the second position corresponding to the unlocked state of the automatically-operated locking device 22, the upper edge 16.1, 16.1' of the cowl 16, 16' can become distanced from the fixed structure 14 in order to allow the opening of the cowl 16, 16'.

The automatically-operated locking device 22 also comprises a fixed stop 28, connected to the fixed structure 14, and against which the locking post 24 bears when the cowl 16, 16' is in the closed position, the latch 26 holding the locking post 24 against the fixed stop 28 in the first position of the latch 26 corresponding to the locked state.

According to one embodiment, the automatically-operated locking device 22 comprises a pivot axis A26 connecting the latch 26 to a support 30 solid with the fixed structure 14. This pivot axis A26 is oriented approximately perpendicularly with respect to the longitudinal direction, parallel to that of the locking post 24. Thus, the latch 26 is configured to pivot about the pivot axis A26 to pass from one of the first or second positions to the other.

In one configuration, the automatically-operated locking device 22 comprises at least one return system 32 configured to hold the latch 26 in its second position corresponding to the unlocked state of the automatically-operated locking device 22, the cowl 16, 16' holding the latch 26 in its first position when the cowl 16, 16' is in the closed position and allowing the latch 26 to pivot toward its second position when the cowl 16, 16' is in the open position.

Thus, according to the invention, the locked or unlocked state of the automatically-operated locking device 22 is controlled by the cowl 16, 16', the automatically-operated locking device 22 being in the locked state when the cowl 16, 16' is in the closed position, and in the unlocked state when the cowl 16, 16' is in the open position.

According to one embodiment, the automatically-operated locking device 22 comprises a lever 34, a first articulation 36 connecting the lever 34 and the latch 26, a connecting rod 38, a second articulation 40 connecting the connecting rod 38 and the support 30, and a third articulation 42 connecting the lever 34 and the connecting rod 38. The first, second and third articulations 36, 40, 42 each comprise at least one pivot axis A36, A40, A42 parallel to the pivot axis A26 of the latch 26.

In one design, the support 30 has an elongate shape, parallel to the longitudinal direction, and extends between first and second ends, the fixed stop 28 being positioned at the first end, the second articulation 40 being positioned at the second end, the pivot axis A26 being positioned between the first and second ends near the fixed stop 28. The support 30 and the fixed stop 28 form one single component.

The latch 26, the support 30, the lever 34 and the connecting rod 38 form a deformable quadrilateral.

According to one embodiment, the return system 32 comprises two traction springs 32.1, 32.1', positioned one on each side of the lever 34, each having a first end connected to the lever 34, approximately equidistant from the first and second articulations 36, 42, and a second end connected to a right-angle bracket 32.2 solid with the support 30. The deformable quadrilateral formed by the latch 26, the support 30, the lever 34 and the connecting rod 38 as well as the right-angle brackets 32.2 are configured so that the traction springs 32.1, 32.1' apply a force that causes the latch 26 to pivot about the pivot axis A26 from the first position toward the second position.

In a simplified configuration, the cowl 16, 16' is in direct contact with the lever 34 in order to hold it in a position corresponding to the first position of the latch 26 or to push it in order to cause the latch 26 to pivot from the second position toward the first position.

In another configuration visible in FIGS. 3 to 11, the automatically-operated locking device 22 comprises a cam 44, solid with the cowl 16, 16', and having a first contact face 46 configured to collaborate with the lever 34. The latter comprises, at one of its ends distanced from the latch 26, a second contact face 48 configured to collaborate with the first contact face 46 belonging to the cam 44.

The second contact face 48 is convex. In one design, the second contact face 48 has an approximately semicylindrical shape with an axis substantially parallel to the longitudinal direction.

The first contact face 46 comprises a first longitudinal groove 46.1 configured to house the lever 34 when the cowl 16, 16' is in the closed position and at the same time the automatically-operated locking device 22 is in the locked state, as well as a second longitudinal groove 46.2 to allow a progressive pivoting movement of the latch 26 from the second position toward the first position. The first and second longitudinal grooves 46.1, 46.2 are approximately parallel to the longitudinal direction and have substantially constant cross sections.

The first and second longitudinal grooves 46.1, 46.2 are separated by a ridge 50 which holds the lever 34 in the first longitudinal groove 46.1 as long as a force exerted to cause the cowl 16, 16' to pivot and open does not exceed a given threshold. The second longitudinal groove 46.2 is configured so that the lever 34 is always in contact with the first contact face 46 belonging to the cam 44 even when the cowl 16, 16' is fully open.

According to the embodiment visible in FIGS. 3 to 11, the automatically-operated locking device comprises a first set of elements solid with the cowl 16, 16', these comprising the locking post 24 and the cam 44, and a second set of elements solid with the fixed structure 14 and comprising the latch 26, the fixed stop 28, the support 30, the lever 34 and the connecting rod 38.

In one design, the automatically-operated locking device 22 is positioned as close as possible to the second articulation point 18.2 so that the latter reacts the forces tending to inflate the cowl 16, 16'.

The principle of operation of the automatically-operated locking device is described with reference to FIGS. 4 to 11.

Figure 4:
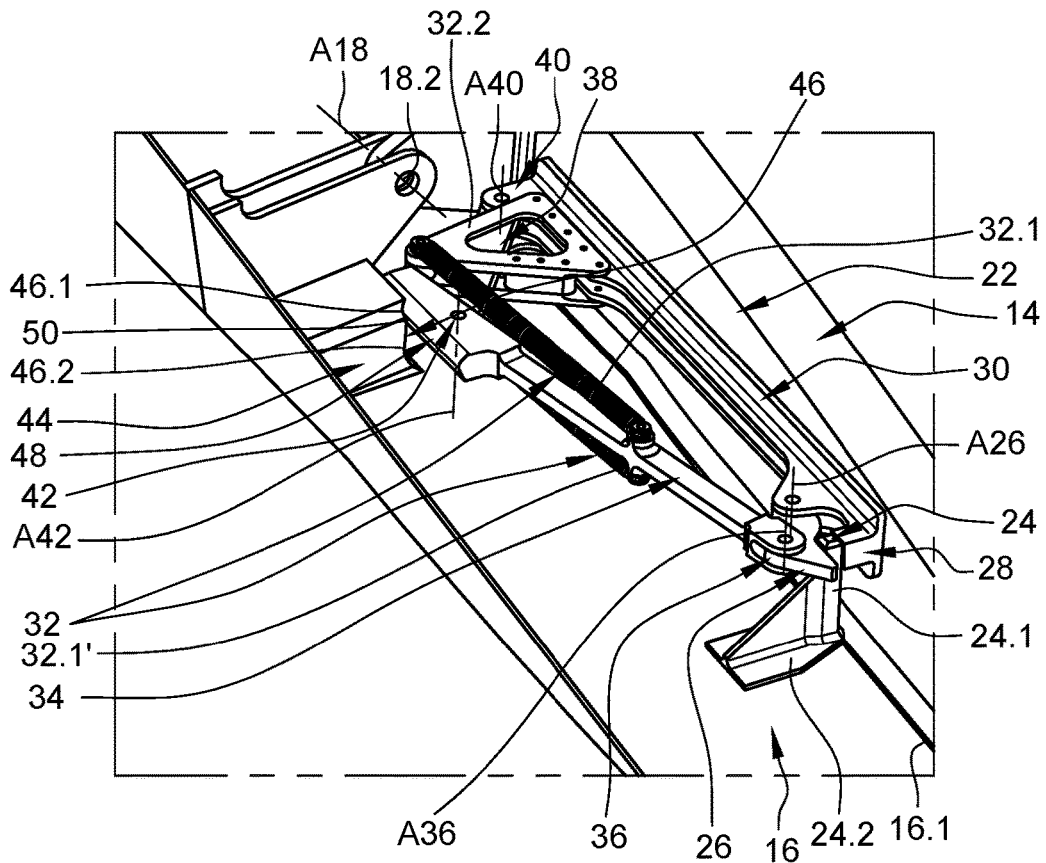
FIG. 4 is a perspective view of an automatically-operated locking device in the locked state illustrating one embodiment of the invention, the cowl being in the closed position.
Figure 5:
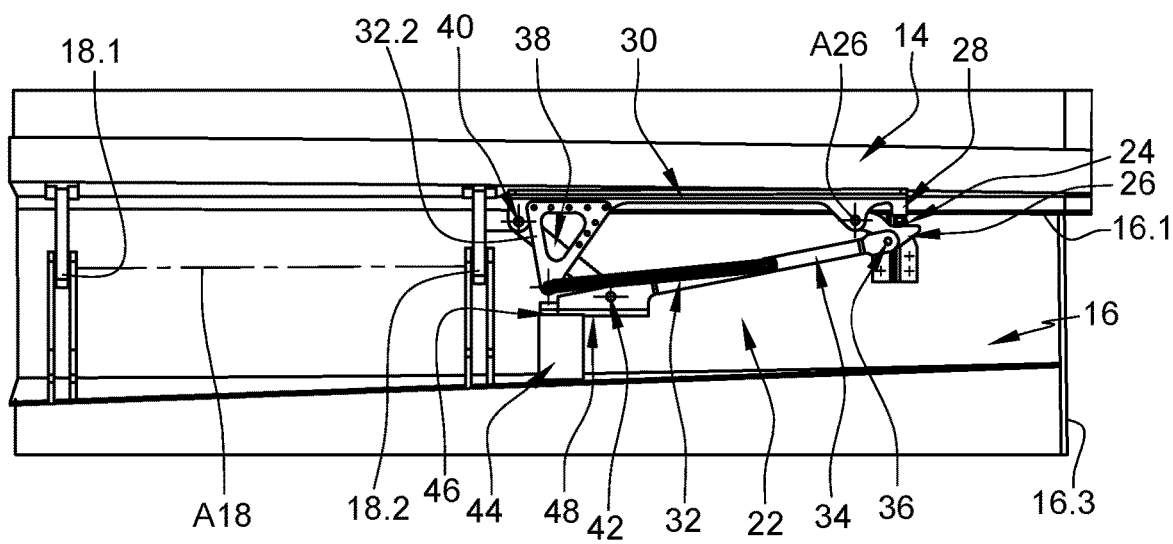
FIG. 5 is a view from above of the automatically-operated locking device visible in FIG. 4.
Figure 6:
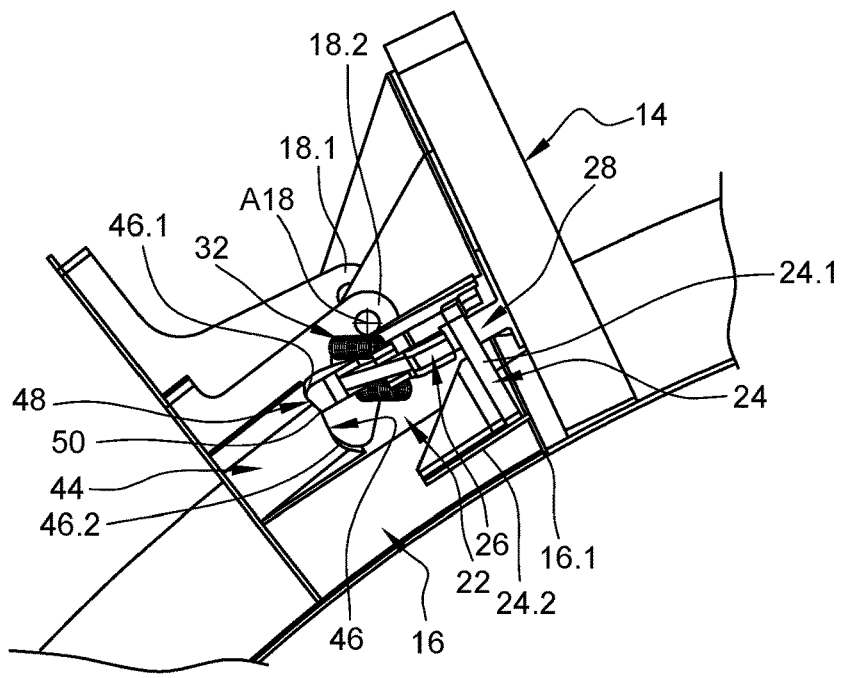
FIG. 6 is a rear view of the automatically-operated locking device visible in FIG. 4.

With the cowl 16 in the closed position, the locking post 24, interposed between the latch 26 and the fixed stop 28 is held against the fixed stop 28 by the latch 26 which occupies the first position corresponding to the locked state, as illustrated in FIGS. 4 to 6. The lever 34 is housed in the first longitudinal groove 46.1 belonging to the cam 44.

Figure 7:
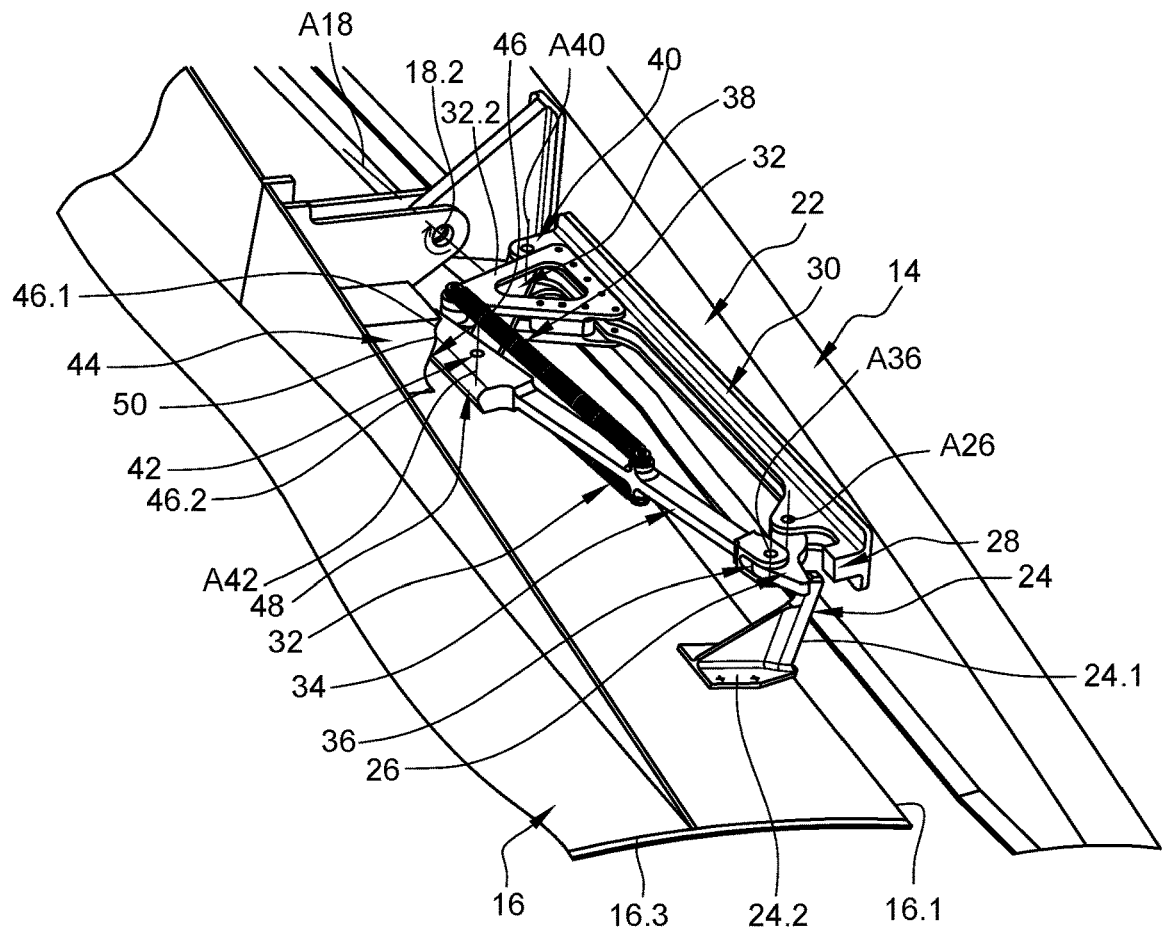
FIG. 7 is a perspective view of the automatic-operated locking device visible in FIG. 4 in the unlocked state, the cowl being partially open.
Figure 8:
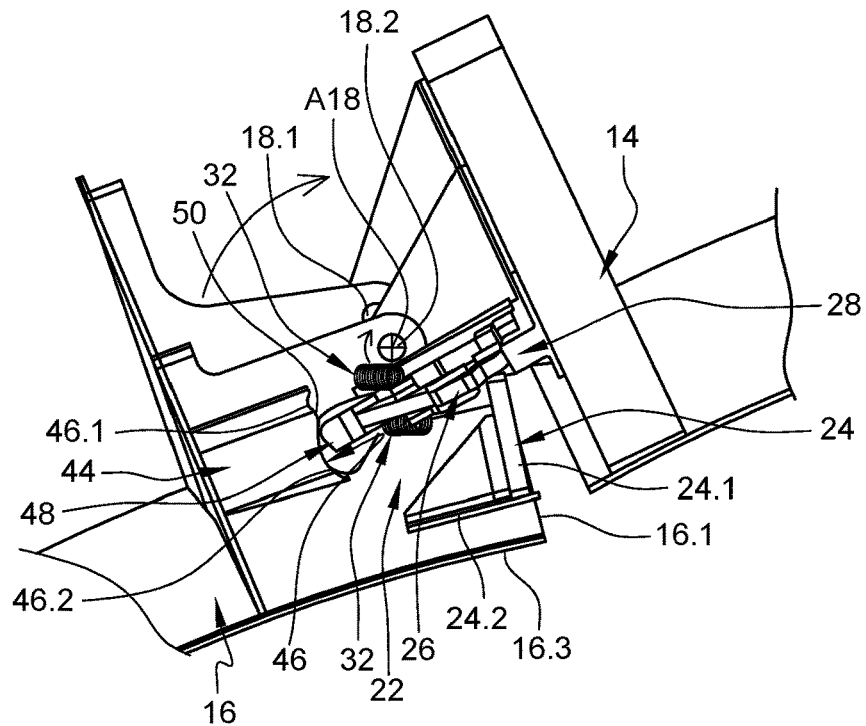
FIG. 8 is a rear view of the automatically-operated locking device visible in FIG. 7.

When an operator wishes to open the cowl 16, 16', he or she unlocks the manually-operated locking devices 20.1, 20.2, 20.3. The cowl 16, 16' can then pivot about the articulation axis A18 and open. The force applied to cause the cowl 16, 16' to start to open is strong enough to cause the lever 34 to leave the first longitudinal groove 46.1. As illustrated in FIGS. 7 and 8, the return system 32 causes the latch 26 to pivot from the first position toward the second position. The latch 26 becomes progressively distanced from the fixed stop 28 and releases the locking post 24. The upper edge 16.1, 16.1' of the cowl 16, 16' can therefore be distanced from the fixed structure 14.

Figure 9:
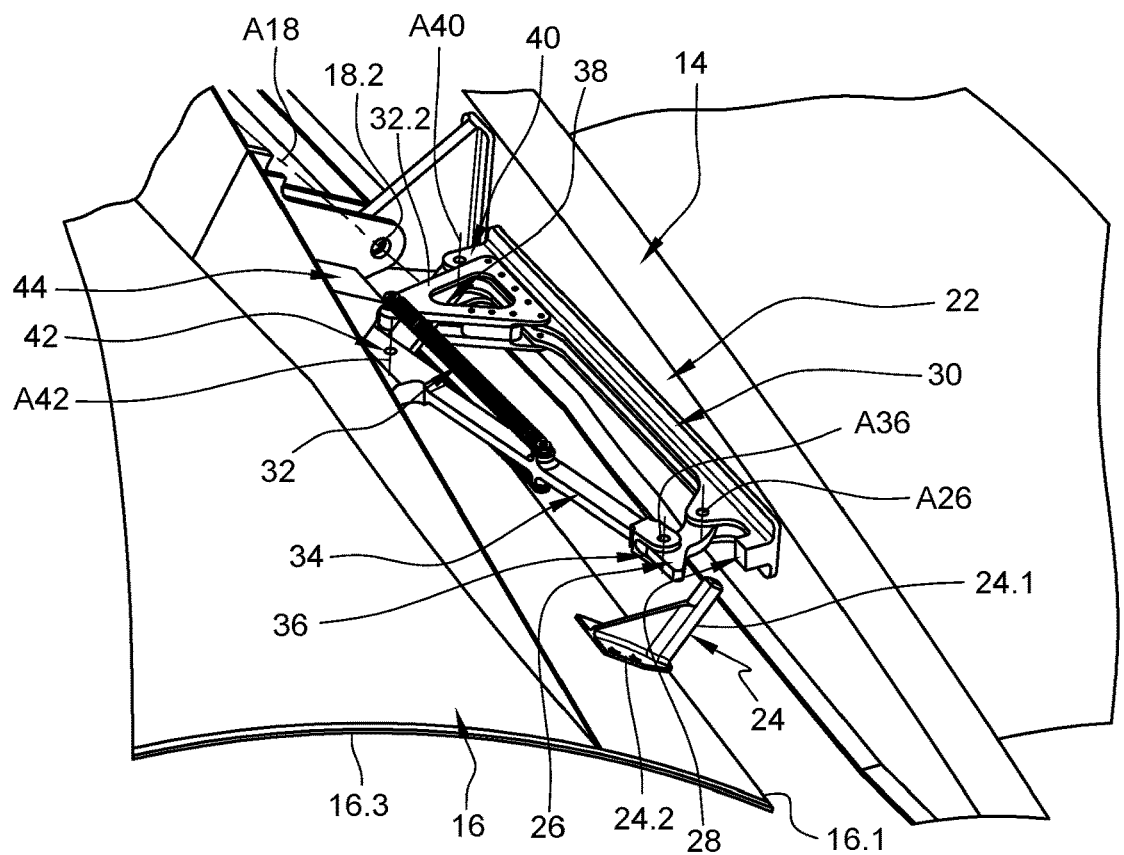
FIG. 9 is a perspective view of the automatically-operated locking device visible in FIG. 4 in the unlocked state, with the cowl open.
Figure 10:
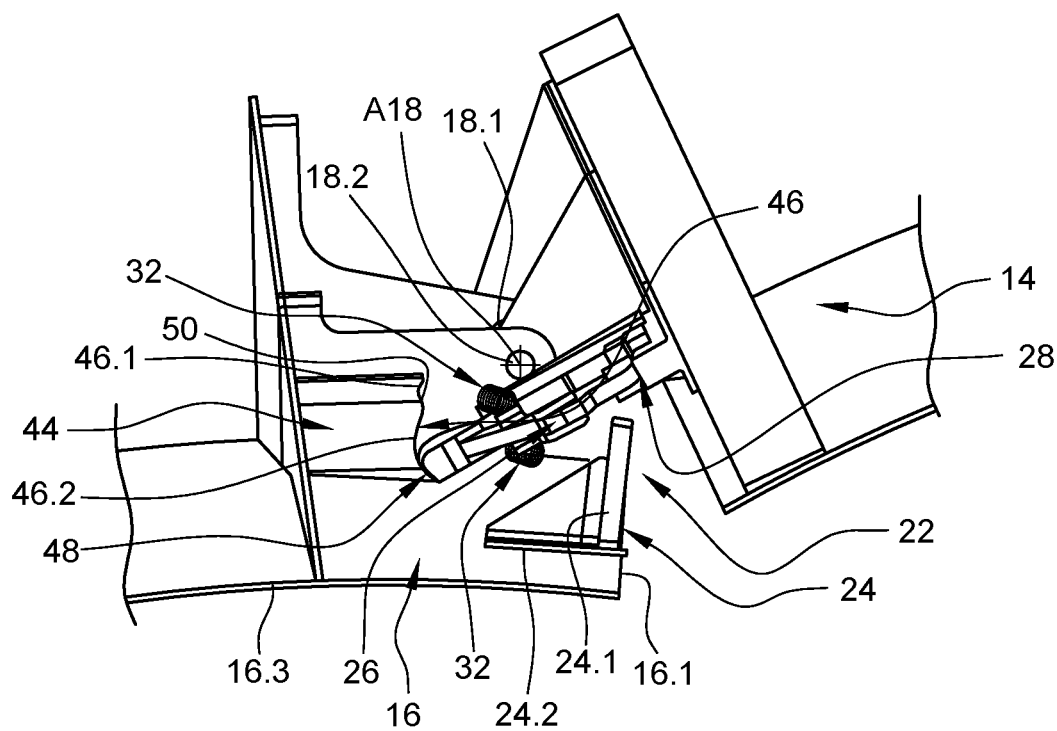
FIG. 10 is a rear view of the automatically-operated locking device visible in FIG. 9.
Figure 11:
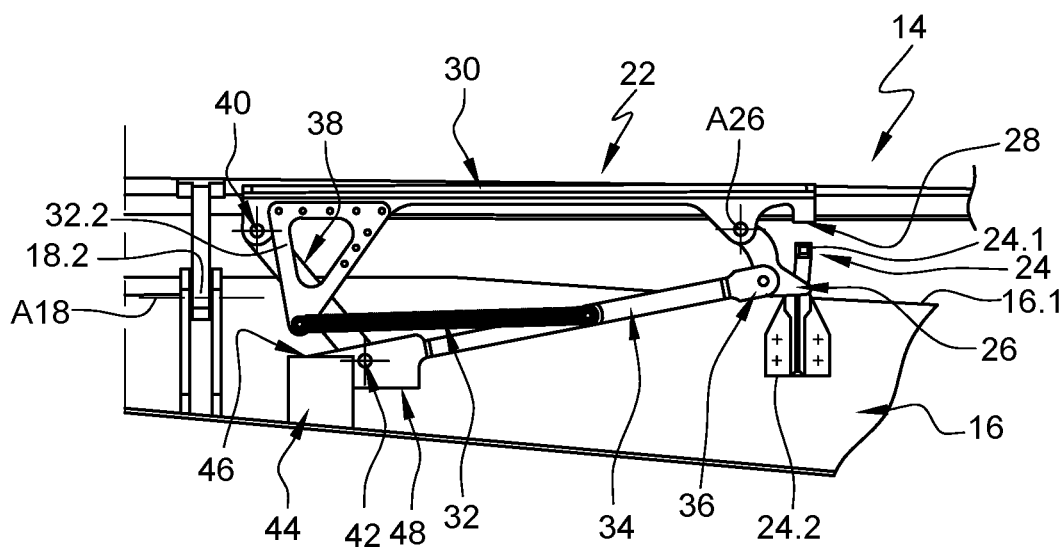
FIG. 11 is a view from above with the automatically-operated locking device visible in FIG. 9.

When the cowl 16, 16' is fully open, as illustrated in FIGS. 9 and 11, the lever 34 is still in contact with the cam 44.

On closure of the cowl 16, 16', the locking post 24 moves progressively closer to the fixed stop 28 and the cam 44 progressively pushes the lever 34 against the action of the return system 32, causing the latch 26 to pivot form the second position toward the first position. When the cowl 16, 16' is almost closed, the lever 34 overcomes the ridge 50 and becomes housed in the first longitudinal groove 46.1. In this position, the latch 26 holds the locking post 24 pressed firmly against the fixed stop 28, preventing the upper edge 16.1, 16.1' of the cowl 16, 16' from becoming distanced from the fixed structure 14. In the absence of a force intended to open the cowl 16, 16', the lever 34 is immobilized in the first longitudinal groove 46.1 and holds the latch 26 in the first position corresponding to the locked state, even if the return system 32 tends to encourage the latch 26 to pivot toward the second position.

The operator can then lock the manually-operated locking devices 20.1, 20.2, 20.3.

The locking device 22 locks and unlocks itself automatically as the cowl 16, 16' is opened and closed.

In flight, the automatically-operated locking device 22 prevents the upper edge 16.1, 16.1' of the cowl 16, 16' from becoming distanced from the fixed structure 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nacelle comprising;
   a fixed structure,
   at least one cowl having upper and lower edges,
   at least one pivot point connecting the upper edge of the at least one cowl and the fixed structure so as to allow the at least one cowl to pivot about an articulation axis parallel to a longitudinal direction between a closed position and an open position, and
   at least one manually-operated locking device for holding the at least one cowl in the closed position,
   wherein the nacelle comprises an automatically-operated locking device comprising
      at least one locking post connected to the at least one cowl,
      at least one latch movable between a first position corresponding to a locked state in which the at least one latch retains the at least one locking post and prevents it from becoming distanced from the fixed structure and a second position corresponding to an unlocked state in which the at least one latch allows the at least one locking post to become distanced from the fixed structure,
      at least one latch bias, the at least one latch bias providing a force biasing the at least one latch in the unlocked state,
   wherein the at least one cowl holds the at least one latch in its first position when the at least one cowl is in the closed position and allows the at least one latch to pivot toward its second position when the at least one cowl is in the open position,
   wherein the automatically-operated locking device comprises a fixed stop, connected to the fixed structure, the at least one latch holding the at least one locking post against the fixed stop when the at least one latch is in the first position corresponding to the locked state.

2. The aircraft nacelle as claimed in claim 1, wherein the automatically-operated locking device is positioned in the vicinity of the upper edge of the at least one cowl, in the same transverse plane as a manually-operating locking device of the at least one manually operated locking device positioned in a vicinity of the lower edge of the at least one cowl.

3. An aircraft nacelle comprising:
   a fixed structure,
   at least one cowl having upper and lower edges,
   at least one pivot point connecting the upper edge of the at least one cowl and the fixed structure so as to allow the at least one cowl to pivot about an articulation axis parallel to a longitudinal direction between a closed position and an open position, and
   at least one manually-operated locking device for holding the at least one cowl in the closed position,
   wherein the nacelle comprises an automatically-operated locking device comprising
      at least one locking post connected to the at least one cowl,
      at least one latch movable between a first position corresponding to a locked state in which the at least one latch retains the at least one locking post and prevents it from becoming distanced from the fixed structure and a second position corresponding to an unlocked state in which the at least one latch allows the at least one locking post to become distanced from the fixed structure,
      at least one latch bias, the at least one latch bias providing a force biasing the at least one latch in the unlocked state,
   wherein the at least one cowl holds the at least one latch in its first position when the at least one cowl is in the closed position and allows the at least one latch to pivot toward its second position when the at least one cowl is in the open position,
   wherein the automatically-operated locking device comprises a pivot axis, approximately perpendicular to the longitudinal direction, connecting the at least one latch to a support solid with the fixed structure, wherein the automatically-operated locking device comprises a lever, a first articulation connecting the lever and the at least one latch, a connecting rod, a second articulation connecting the connecting rod and the support, as well as a third articulation connecting the lever and the connecting rod, the first, second and third articulations each comprising at least one pivot axis parallel to the pivot axis of the at least one latch.

4. The aircraft nacelle as claimed in claim 3, wherein the at least one latch bias is a return system comprising two traction springs which are positioned one on either side of the lever, each having a first end connected to the lever as well as a second end connected to a separate right-angle bracket solid with the support, the at least one latch, the support, the lever, the connecting rod and the right-angle brackets being configured so that the traction springs exert a force that causes the at least one latch to pivot about the pivot axis from the first position toward the second position.

5. The aircraft nacelle as claimed in claim 3, wherein the automatically-operated locking device comprises a cam, solid with the at least one cowl, having a first contact face configured to collaborate with the lever, the lever comprising, at one of its ends distant from the at least one latch, a second contact face configured to collaborate with the first contact face belonging to the cam.

6. The aircraft nacelle as claimed in claim 5, wherein the second contact face is convex and has an approximately semicylindrical shape with an axis substantially parallel to the longitudinal direction.

7. The aircraft nacelle as claimed in claim 6, wherein the first contact face comprises a first longitudinal groove configured to house the lever when the automatically-operated locking device is in the locked state, as well as a second longitudinal groove to allow a progressive pivoting of the at least one latch from the second position toward the first position.

8. The aircraft nacelle as claimed in claim 7, wherein the first and second longitudinal grooves are separated by a ridge that holds the lever in the first longitudinal groove as long as a force exerted for causing the at least one cowl to pivot and open does not exceed a given threshold.

9. The aircraft nacelle as claimed in claim 3, wherein the automatically-operated locking device is positioned in the vicinity of the upper edge of the at least one cowl, in the same transverse plane as a manually-operating locking device of the at least one manually operated locking device positioned in a vicinity of the lower edge of the at least one cowl.

* * * * *